E. R. HIBBARD.
NUT LOCK.
APPLICATION FILED OCT. 25, 1912.
1,228,671.
Patented June 5, 1917.
2 SHEETS—SHEET 1.
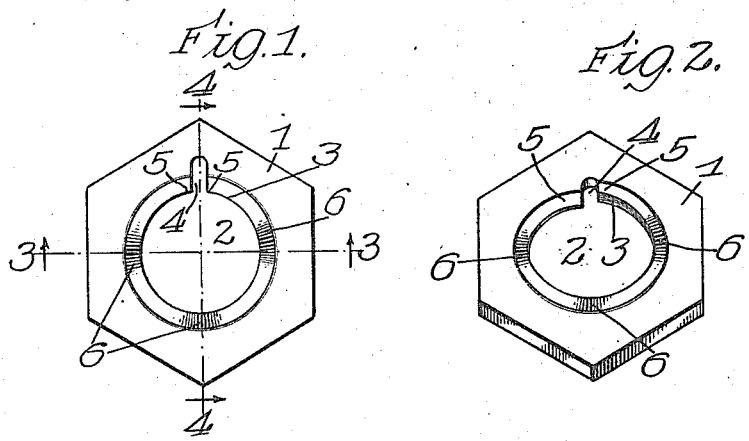
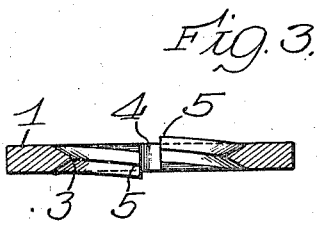
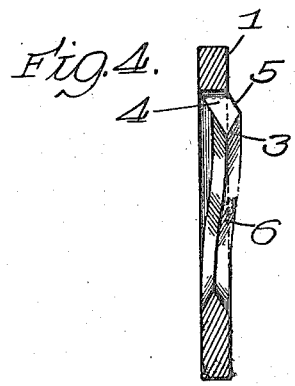
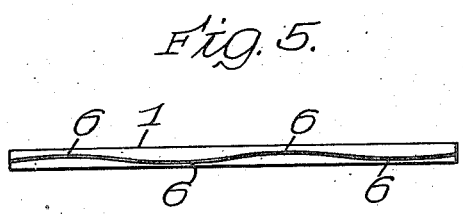
Witnesses:
Inventor:
Edward R. Hibbard
By Hill & Hill,
Attys.

E. R. HIBBARD.
NUT LOCK.
APPLICATION FILED OCT. 25, 1912.
1,228,671.
Patented June 5, 1917.
2 SHEETS—SHEET 2.
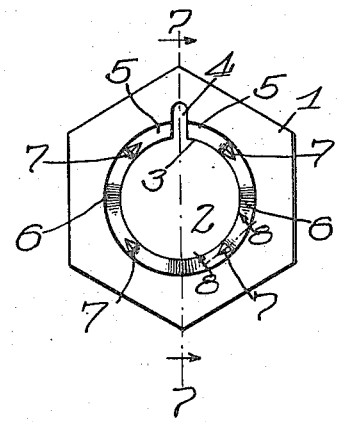
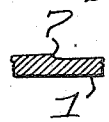
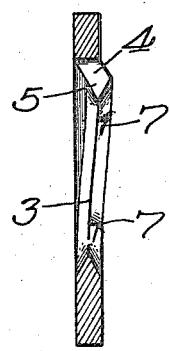
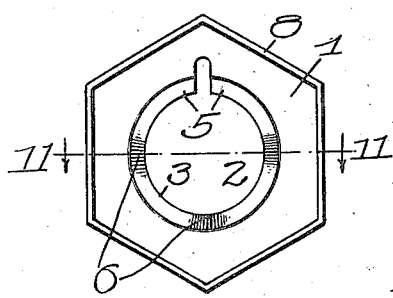
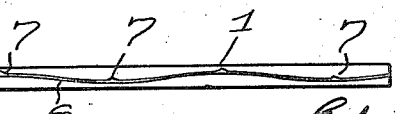
Witnesses:
G. W. Domarus Jr.
W. T. Kilroy
Inventor
Edward R. Hibbard
By Neil & Niee, Attys

UNITED STATES PATENT OFFICE.

EDWARD R. HIBBARD, OF CHICAGO, ILLINOIS, ASSIGNOR TO GRIP NUT COMPANY, OF CHICAGO, ILLINOIS, A CORPORATION OF ILLINOIS.

NUT-LOCK.

1,228,671.  Specification of Letters Patent.  Patented June 5, 1917.

Application filed October 25, 1912. Serial No. 727,748.

*To all whom it may concern:*

Be it known that I, EDWARD R. HIBBARD, a citizen of the United States, residing at Chicago, in the county of Cook and State of Illinois, have invented certain new and useful Improvements in Nut-Locks, of which the following is a description.

My invention belongs to that general class of devices adapted to be engaged with a bolt, either as a nut alone, or in coöperation therewith, and so constructed as to tend to prevent the accidental disengagement of the nut and bolt.

To this end my invention consists in the novel construction of the device herein shown and described.

In the drawings wherein like reference characters indicate like or corresponding parts:

Figure 1 is a plan view of the lock embodying my invention.

Fig. 2 is a perspective view of the same.

Fig. 3 is a sectional view on line 3, 3 of Fig. 1, showing the ends of the severed thread permanently displaced in opposite directions a distance greater than the pitch of the thread of the bolt upon which it is adapted to be used.

Fig. 4 is a sectional view on line 4, 4 of Fig. 1.

Fig. 5 is a diagrammatic view indicating the formation of the thread member on said lock.

Fig. 6 is a plan view of a modified form of my invention.

Fig. 7 is a sectional view on line 7, 7 of Fig. 6.

Fig. 8 is a sectional view on line 8, 8 of Fig. 6.

Fig. 9 is a diagrammatic view similar to Fig. 5, showing a slightly modified form of thread on the lock member.

Fig. 10 is a plan view of another modification.

Fig. 11 is a sectional view on line 11, 11 of Fig. 10.

In the drawings, 1 indicates a washer or nut blank, having formed therein a bolt opening 2. The washer is preferably punched out, and when so formed the inner wall of the opening 2 is brought substantially to a V-shape, as shown in Figs. 3 and 4, at 3 adapted to coöperate with the sunk portions between the two projecting threads of a bolt. At one or more points, as at 4, the circular wall of the punched opening 2 is separated, leaving the two ends 5, 5 slightly separated, which are given a twist, or offset from one another on the plane of the washer, so as to permit the V-shaped washer to conform to the regular progression of a thread on a bolt, and the nut or washer 1 may be threaded on said bolt in the manner common to bolt nuts. In addition thereto, the said thread member 3 is undulated or waved, as most clearly shown at 6, 6 of Fig. 5. This construction causes the said member 3 to be pressed upon and frictionally engage with the opposite walls of the depression between two extending threads of the bolt. The nut or lock being preferably of resilient material, produces a resilient frictional engagement of the nut with the bolt threads, preferably at a plurality of points.

In operation the lock may be employed either with or without the ordinary bolt nut. However, where any severe strain is likely to come upon the parts, it is preferable to employ the usual nut to take the strain, and employ my improved nut or lock mainly for the purpose of locking the parts in position and preventing the nut becoming loosened by use or the jarring of parts, or in any other accidental way.

As a modification of the lock just described, I prefer, in punching the lock out, to construct comparatively sharp impinging shoulders 7, 7 on one or both sides of the thread portion 3 extending in a direction which will permit the lock to be readily screwed down upon the bolt 1, but upon undertaking to back the lock off, will tend to impinge upon the adjacent portion of the bolt thread and engage therewith, thereby rendering the removal of the lock more difficult. Obviously these offset portions should be positioned upon the highest or the lowest point, so to speak, of the thread, which will bring them at a point where the greatest pressure is brought upon the adjacent portion of the bolt thread. They may also be conical, semi-conical or substantially pyramidical shaped, as shown in Fig. 7, or square faced, as in Fig. 8.

As an additional improvement, and serving as a matter of convenience in positioning or removing the lock, and to facilitate the engagement of the wrench therewith, the marginal edges of the lock may be turned up during the punching process, as shown at 8 in Figs. 10 and 11, thus providing a sufficient width to permit a firm grip on the lock with the wrench.

It is obvious that immaterial modifications may be made without departing from the spirit of my invention. Thus, for example, a plurality of cuts 4 may be provided, or the undulations be increased, be decreased, or be made more or less pronounced, or the offset portions of the shoulders 7 formed on only one side of the thread rather than on both, or be increased in number. The broad idea of invention, however, consists essentially in providing a lock in which the marginal wall of the bolt hole is formed to coöperate with the bolt by threaded engagement, and in which the thread member on the lock is undulated and offset in opposite directions, so as to cause the said threaded portion to be maintained in frictional engagement with the opposite faces of the coöperating and adjacent bolt threads. In the preferred construction the severed ends of the single thread are permanently displaced in opposite directions a distance greater than the thread of the bolt upon which the lock is adapted to be used. This results in an added function, the severed ends being in frictional engagement with the wall of the bolt thread, and tending to more firmly engage the lock in position.

Having thus described my invention, it is obvious that various immaterial modifications may be made in the same within the scope of the appended claims without departing from the spirit of my invention, hence I do not wish to be understood as limiting myself to the exact form, construction, arrangement and combination of parts herein shown and described, or uses mentioned.

What I claim as new and desire to secure by Letters Patent is:

1. A nut lock, comprising a disk, having formed therein a bolt hole, the adjacent wall of which is permanently displaced laterally beyond one face of the disk to form a single substantially resilient undulating spiral thread thereat, adapted to engage the threaded portion of a bolt.

2. A nut lock, comprising a disk having formed therein a bolt hole, the adjacent wall being broken and permanently offset laterally on both sides to form a single resilient progressive thread, the thread being undulated to cause the opposite faces thereof to firmly engage the threads of a bolt upon which the lock may be placed.

3. A nut lock comprising a disk having formed therein a bolt hole, the wall of which is V-shaped to form a thread member, and severed and permanently offset laterally to form a single spiral thread, said thread member being undulated and provided with impinging shoulders extending in one direction only, whereby the disk may be threaded upon a bolt and forced home thereon, and upon backing the disk off the said shoulders will tend to impinge upon the adjacent portions of the bolt thread to prevent accidental disengagement of the parts.

4. A nut lock, comprising a disk, having formed therein a bolt hole, the wall of which is V-shaped to form a thread member, and is severed to permit the disk to be threaded upon a bolt, and to form a single progressive resilient thread thereon, said thread member being undulated and provided with an impinging shoulder, tending to impinge upon the adjacent portions of the thread of a bolt upon which the lock is placed to prevent accidental disengagement of the parts.

5. A nut lock, comprising a disk having a bolt hole formed therein, the wall of which is V-shaped to form a single resilient thread adapted to engage a bolt thread and permanently displaced on opposite sides of the disk, a distance greater than the pitch of the thread of the bolt upon which it is adapted to be used.

In testimony whereof, I have hereunto signed my name in the presence of two subscribing witnesses.

EDWARD R. HIBBARD.

Witnesses:
 Roy W. Hill,
 Charles I. Cobb.